(12) United States Patent
Ito

(10) Patent No.: US 12,442,807 B2
(45) Date of Patent: Oct. 14, 2025

(54) AROMA COMPONENT ASSESSMENT METHOD AND FLAVOR AND/OR FRAGRANCE COMPOSITION PREPARATION METHOD

(71) Applicant: Takasago International Corporation, Tokyo (JP)

(72) Inventor: Shinichiro Ito, Kanagawa (JP)

(73) Assignee: Takasago International Corporation, Tokyo (JP)

(*) Notice: Subject to any disclaimer, the term of this patent is extended or adjusted under 35 U.S.C. 154(b) by 509 days.

(21) Appl. No.: 18/007,999

(22) PCT Filed: Jun. 3, 2021

(86) PCT No.: PCT/JP2021/021203
§ 371 (c)(1),
(2) Date: Dec. 2, 2022

(87) PCT Pub. No.: WO2021/246489
PCT Pub. Date: Dec. 9, 2021

(65) Prior Publication Data
US 2023/0273168 A1     Aug. 31, 2023

(30) Foreign Application Priority Data
Jun. 4, 2020  (JP) ................ 2020-097718

(51) Int. Cl.
*G01N 33/02* (2006.01)
*A23L 27/20* (2016.01)
*C11B 9/00* (2006.01)
*G01N 33/00* (2006.01)

(52) U.S. Cl.
CPC .......... *G01N 33/02* (2013.01); *A23L 27/20* (2016.08); *C11B 9/00* (2013.01); *G01N 33/0067* (2013.01)

(58) Field of Classification Search
CPC . A23G 1/32; A23G 1/305; A23G 1/48; A23G 9/32; A23G 9/42; A23L 27/20; C11B 9/00; A23C 9/1307; G01N 33/0047; G01N 33/0067; G01N 33/02
USPC .......................................................... 512/1
See application file for complete search history.

(56) References Cited

U.S. PATENT DOCUMENTS

| | | | |
|---|---|---|---|
| 6,194,362 B1 | 2/2001 | Trinh et al. | |
| 2009/0053388 A1 | 2/2009 | Powers et al. | |
| 2010/0168253 A1* | 7/2010 | Shoji ...................... | C11B 9/0061 512/26 |
| 2014/0220195 A1 | 8/2014 | Kohn et al. | |
| 2019/0218476 A1 | 7/2019 | Blondeau et al. | |
| 2019/0367837 A1 | 12/2019 | Teixeira et al. | |
| 2021/0207058 A1 | 7/2021 | Teixeira et al. | |

FOREIGN PATENT DOCUMENTS

| | | |
|---|---|---|
| CN | 101445765 A | 6/2009 |
| CN | 102341488 A | 2/2012 |
| EP | 2 404 987 A1 | 1/2012 |
| JP | 11-507097 A | 6/1999 |
| JP | 2007-063251 A | 3/2007 |
| JP | 2007-236233 A | 9/2007 |
| JP | 2010-536369 A | 12/2010 |
| JP | 2016-045156 A | 4/2016 |
| JP | 2018-141741 A | 9/2018 |
| JP | 2019-529683 A | 10/2019 |
| JP | 2020-500227 A | 1/2020 |

OTHER PUBLICATIONS

Roberts et al., "Simulation of Retronasal Aroma Using a Modified Headspace Technique: Investigating the Effects of Saliva, Temperature, Shearing, and Oil on Flavor Release," J. Agric. Food Chem., 1994, 43:2179-2186.

Boland et al., "Influence of gelatin, starch, pectin and artificial saliva on the release of 11 flavour compounds from model gel systems," Food Chemistry, 2004, 86:401-411.

Heenan et al., "PTR-TOF-MS monitoring of in vitro and in vivo flavour release in cereal bars with varying sugar composition," Food Chemistry, 2012, 131:477-484.

Munoz-Gonzalez et al., "Wine matrix composition affects temporal aroma release as measured by proton transfer reaction—time-of-flight—mass spectrometry," Australian Journal of Grape and Wine Research, Australian Society of Viticulture and Oenology, AU, Jul. 14, 2015, 21(3):367-375.

(Continued)

*Primary Examiner* — Jessica Whiteley
(74) *Attorney, Agent, or Firm* — Foley & Lardner LLP

(57) ABSTRACT

The present invention pertains to an aroma component assessment method and a method for preparing a fragrance composition using said assessment method. The present invention provides a fragrance composition appropriate for a product in consideration of usage conditions of the product. For that purpose, the present invention involves: making measurements of the rate of concentration increase (i.e., detection quantity a of aroma component after lapse of a predetermined time after start of measurement/detection quantity b of aroma component immediately after the start of detection) of aroma released within a prescribed time range for each of two or more types of aroma components contained in a product within a consumption environment of said product or within a model environment thereof; and assessing the impact of the aroma components contained in the product on fragrance impressions of the product, using the magnitude relationship in the aroma concentration increase rate of the two types or more aroma components, as an index correlated with the magnitude relationship of the impacts on fragrance impressions of the product, so as to make objective and appropriate assessments of the impacts of the aroma components contained in the product on fragrance impression.

12 Claims, 3 Drawing Sheets

(56) References Cited

OTHER PUBLICATIONS

Kai et al., "Effects of UV Radiation on the Internal Quality of Tobacco Top Leaves in Quijing of Yunnan," Chinese Tobacco Science, Dec. 2014, 35(6):80-84, with English abstract.

\* cited by examiner

AROMA COMPONENT ASSESSMENT METHOD AND FLAVOR AND/OR FRAGRANCE COMPOSITION PREPARATION METHOD

CROSS-REFERENCE TO RELATED APPLICATIONS

This application is the U.S. National Stage of PCT/JP2021/021203, filed Jun. 3, 2021, which claims priority to JP 2020-097718, filed Jun. 4, 2020.

TECHNICAL FIELD

The present invention relates to a method for evaluating aroma components that can be added to products such as foods or cosmetic products. The invention also relates to a method for preparing a flavor and/or fragrance composition, the method including a step of evaluating aroma components by the above evaluation method and adjusting the prescription ratio of said aroma components based on the evaluation.

BACKGROUND ART

Consumers have opportunities to experience aromas in all aspects of their daily lives. When consuming foods or when using cosmetic products, aromas have an aspect of giving senses to human, for example, the flavors of food products give us the sense of "deliciousness" and the aromas of cosmetic products give us the sense of "pleasantness". Among the things that produce such aromas, there are natural flavors and/or fragrances such as essential oils, as well as formulated flavors and/or fragrances developed by flavorists and perfumers. A formulated flavor and/or fragrance is a combination of aroma components selected from thousands of aroma ingredients, and is created as an aroma that evokes various foods and plants. In addition, aromas are created in consideration of the environment where they are used and the consumer preferences. While a formulated flavor and/or fragrance developed for such a purpose is prepared by mixing various aroma components in a container, in the process of completing the formulated flavor and/or fragrance, a procedure of checking the aroma of the formulated flavor and/or fragrance itself and a procedure of checking the aroma by tasting a prototype product or using a prototype cosmetic product simulating the final product in an environment where the product is actually used are repeated. There are several important aspects in producing such a prototype product. One of the aspects is the difference between the aroma diffusion characteristic of the aroma component itself and the aroma diffusion characteristic of the aroma component upon consuming or using a food or cosmetic product containing the aroma component. In a case of a food, not only the base of the food affects the aroma diffusion of the aroma components, but also saliva and other substances mediate the aroma diffusion of the aroma components during chewing, and such an effect often changes the aroma diffusion characteristics of the aroma components contained in the food to be different from those of the aroma components themselves. The same can also happen to cosmetic products. Not only the base of a cosmetic product affects the aroma diffusion of the aroma components, but also water and other substances mediate the aroma diffusion of aroma components in the environment where the cosmetic product is used, and such an effect often changes the aroma diffusion characteristics of the aroma components contained in the cosmetic product to be different from those of the aroma components themselves. The classification of top, middle, and last notes has been conventionally used to describe the characteristics of aroma components themselves, but it is difficult to apply the same classification when changes occur in the aroma diffusion characteristics. The procedure of checking the aroma, which is very important for the development of a formulated flavor and/or fragrance, is time-consuming. Therefore, in the past, this process relied on the experience and sensibility of skilled flavorists and perfumers, but in recent years, the characteristics of various aroma components are evaluated by various methods and they are used in the development of formulated flavors and/or fragrances.

For example, a simple, objective, and efficient evaluation method that uses gas chromatography is known for separating diffusible aroma components that are useful for reproducing the expression of an aroma of, for example, a freshly prepared, cooked, or brewed hot food in the mouth from those that do not contribute to the expression of such an aroma (see Patent literature 1). However, this method is an evaluation method that focuses on the difference in the retronasal aroma when consuming foods between separately prepared samples at different temperatures, and does not focus on the aroma diffusion characteristics of aroma components upon changing the temperature or shape of a single sample, nor on the changes in aroma concentration over time.

Furthermore, a method of formulating a flavor and/or fragrance is known in which a flavor and/or fragrance composition is put into an oral-model-environment solution with artificial saliva and a non-oral-environment solution without artificial saliva to collect and analyze volatilized aroma components from each of them, and a correction value is calculated from the difference between them to correct the composition ratio of the flavor and/or fragrance composition (see Patent literature 2). However, this method is a method for calculating a correction value based on the presence or absence of artificial saliva, and does not focus on the aroma diffusion characteristics upon changing the temperature or shape of a single sample, nor on the changes in aroma concentration over time.

In addition, there is an example of a study in which drinking water containing aroma components was poured into a human throat model environment to collect volatilized aroma components, and their quantities were detected at 6 time points during 15 minutes by instrumental analysis to obtain the slope indicating how the quantities detected increased with time (see Non-patent literature 1). In this study, it is reported that the slope increased 2-fold by increasing the temperature of the drinking water and decreased by adding artificial saliva to the model environment, but it does not focus on the aroma diffusion characteristics upon changing the temperature or shape of a single sample, nor on the changes in aroma concentration over time.

Furthermore, an aromatic accord containing aroma components of classes 1, 2, and 3 defined based on experimental velocity in a predetermined ratio is known to be a high performance and high impact bloom accord (see Patent literature 3). However, this method is an evaluation method that performs classification based on the experimental velocity obtained by mixing a cosmetic product and water and measuring the time taken for the sense of smell to be detected by human at a distance from the mixture. This method focuses on the aroma diffusion characteristics upon changing the temperature or shape of a single sample, but it deals with aroma diffusion characteristics with respect to physical distance and does not show the change in aroma concentration over time.

It is also known how to provide significantly different aromas while still having the same intensity, depending on whether the aroma is evaluated initially under wet conditions or evaluated under dry conditions after a certain period of time (see Patent literature 4). However, this method is a method that adds aroma components grouped by equilibrium headspace concentrations measured by a known method in a predetermined ratio, and it does not focus on the aroma diffusion characteristics upon changing the temperature or shape of a single sample, nor on the changes in aroma concentration over time.

In addition, there is a known method in which an aroma component is characterized as a blooming flavor and/or fragrance component based on physical properties such as the boiling point of the aroma component (see Patent literature 5). However, this method is a method that evaluates the aroma diffusion characteristics based on the calculated values, and it does not focus on the aroma diffusion characteristics upon changing the temperature or shape of a single sample, nor on the changes in aroma concentration over time.

CITATION LIST

Patent Literature

Patent Literature 1: Japanese Unexamined Patent Application Publication No. 2016-45156
Patent literature 2: Japanese Patent Publication No. 2007-236233
Patent literature 3: Japanese Unexamined Patent Application Publication (Translation of PCT) No. 2020-500227
Patent literature 4: Japanese Unexamined Patent Application Publication (Translation of PCT) No. 2019-529683
Patent literature 5: Japanese Unexamined Patent Application Publication (Translation of PCT) No. H11-507097

Non-Patent Literature

Non-patent literature 1: J. Agric. Food Chem. (1995), 43, 2179-2186

SUMMARY OF INVENTION

Technical Problem

As described above, the conventional methods evaluate the characteristics of aroma components either based on differences in the conditions or by focusing on specific physical properties, and do not focus on the aroma diffusion characteristics upon changing the temperature or shape of a single sample, nor on the changes in aroma concentration over time. In order to provide a flavor and/or fragrance composition with a more controlled retronasal aroma expression and a product containing such a flavor and/or fragrance composition, it is desirable to evaluate the effects of the aroma components contained in the product on the aromatic impression by taking more actual consumption environments into account.

Solution to Problem

The present inventor first thought that if it is possible to capture the behavior of an aroma spreading in an oral cavity and nasal cavity through a posterior nostril while consuming a food, and the behavior of an aroma spreading in an environment where a cosmetic product is used from the moment when the state of the food or cosmetic product changes, it would be possible to obtain information closely related to the sensations actually felt by humans. For this purpose, it is necessary to construct an environment modeled on the oral cavity for foods and an environment modeled on the situation of usage for cosmetic products.

The present inventor also focused on the change in the concentration of each aroma component over time in considering the behavior of aroma diffusion, and came up with the idea that it is possible to evaluate the aroma diffusion characteristics in an environment where a product is consumed by determining the ratio of the detected quantity immediately after the start of detection by an analysis using an instrumental to the detected quantity after a given time period (i.e., the rate of increase in the aroma concentration). It is also possible to obtain the "speed of diffusion per unit time" from the measurement time and the amount detected by the measurements using an instrument, but this would be highly dependent on the actual values measured with the instrument. In addition, the aroma diffusion characteristics of aroma components whose detected quantities are small but whose detected quantities significantly increase in a given time period will be overlooked. For this reason, the present inventor decided to use the ratio of detected quantities between two time points as an index in order to evaluate the aroma diffusion characteristics of each aroma component more appropriately in the environment where the product is consumed.

Based on this idea, the present inventor placed artificial saliva and a stirrer in a container warmed to about the temperature of a human body, fed chocolate for ice coating added with flavor and/or fragrance components into the container, and measured, using a proton transfer reaction mass spectrometer "PTR-TOFMS", the amount of each aroma component detected in the headspace where the aroma components were released as the ice chocolate was mixed with and dissolved in the artificial saliva. When the ratio of the amount detected immediately after the start of detection to the amount detected 60 seconds after the start of detection was calculated for each of several tens of aroma components, differences were seen among the aroma components.

Next, based on the above idea, the present inventor placed tap water and a stirrer in a container at room temperature, put a dishwashing detergent added with flavor and/or fragrance components into the container, and measured, using proton transfer reaction mass spectrometer "PTR-TOFMS", the amount of each aroma component detected in the headspace where the aroma components were released as the dishwashing detergent foamed up by being mixed with the tap water. When the ratio of the amount detected immediately after the start of detection to the amount detected 20 seconds after the start of detection was calculated for each of several tens of aroma components, differences were seen among the aroma components.

The ratio of the detected quantities described above indicates the aroma diffusion characteristics of each aroma component in the model environment, and thus they can be used as an index to control the expression of the retronasal aromas from foods and the diffusion of aromas from cosmetic products when formulating a flavor and/or fragrance component of interest.

As described above, the present invention focuses on the fact that, in an environment where a product is consumed or in a model environment thereof, there is a difference among aroma components contained in the product in the rates of increase in the aroma concentrations that are released in a given time period after a change in the state of the product. Thus, the present invention relates to the following: a method for evaluating aroma components; a method for preparing a flavor and/or fragrance composition, comprising the steps of evaluating aroma components by the above evaluation method and adjusting the prescription ratio of the aroma components contained in a product based on the evaluation; and a method for adjusting the flavor and/or fragrance dosage of a flavor and/or fragrance composition in a product, comprising the steps of evaluating aroma components by the above evaluation method and adjusting the prescription ratio of the aroma components contained in the product based on the evaluation of the aroma components.

[1] A method for evaluating effects of aroma components contained in a product on aromatic impression when the aroma components are released in an environment where the product is consumed, the method comprising the steps of:

1) measuring, for each of two or more aroma components contained in the product, the rate of increase in the aroma concentration released in a given time period (quantity a of the aroma component detected after a given time period following the start of measurement/quantity b of the aroma component detected immediately after the start of detection) in an environment where the product is consumed or in a model environment thereof;

2) obtaining the magnitude relationship between the rates of increase in the aroma concentrations of the two or more aroma components obtained in Step 1); and 3) evaluating the effects of the aroma components contained in the product on the aromatic impression of the product, using the magnitude relationship between the rates of increase in the aroma concentrations of the two or more aroma components obtained in Step 2) as an index that correlates with the magnitude relationship between the magnitude of their effects on the aromatic impression of the product.

[2] The evaluation method according to [1] above, wherein the environment where the product is consumed is an environment where the product is consumed without the release characteristics of the aroma components being changed by interaction with other substance.

[3] The evaluation method according to [1] above, wherein the environment where the product is consumed is an environment where the product is consumed with the release characteristics of the aroma components being changed by interaction with other substances.

[4] The evaluation method according to [2] above, wherein the product is a food and the measurement of the rate of increase in the aroma concentration in Step 1) is performed in an environment where the aroma is diffused.

[5] The evaluation method according to [3] above, wherein the product is a food product, other substance comprises saliva from human or artificial saliva, and the measurement of the rate of increase in the aroma concentration in Step 1) is performed in an oral cavity model environment.

[6] The evaluation method according to [3] above, wherein the product is a food, other substance comprises water, and the measurement of the rate of increase in the aroma concentration in Step 1) is performed in an environment where the aroma is diffused.

[7] The evaluation method according to any one of [1] to [3] above, wherein the product is a cosmetic product and the measurement of the rate of increase in the aroma concentration in Step 1) is performed in an environment where the aroma is diffused.

[8] The evaluation method according to [3] above, wherein the product is a cosmetic product and other substance comprises one or more selected from the group consisting of water, hair, skin, bathtub, floor, cloth, and glass.

[9] The evaluation method according to any one of [1] to [8] above, the method comprising, in Step 1), measuring the rate of increase in the aroma concentration using a gas chromatograph, mass spectrometer, or detector.

[10] A method for preparing a flavor and/or fragrance composition, the method comprising the steps of:

A) evaluating effects of aroma components contained in a product on the aromatic impression when the aroma components are released in an environment where the product is consumed, by the evaluation method according to any one of [1] to [9] above; and B) preparing a flavor and/or fragrance composition by adjusting the prescription ratio of the aroma components contained in the product based on the evaluation obtained in step A).

[11] The method for preparing a flavor and/or fragrance composition according to [10] above, the method comprising, in Step B), adjusting the prescription ratio of the aroma components in the flavor and/or fragrance composition used for the product by increasing or decreasing the ratio of the amount of the aroma component which has been defined to have significant effect
on the aromatic impression of the product.

[12] A method for adjusting a flavor and/or fragrance dosage of a flavor and/or fragrance composition in a product, the method comprising the steps of:

i) evaluating effects of aroma components contained in the product on the aromatic impression when the aroma components are released in an environment where the product is consumed, by the evaluation method according to any one of [1] to [9] above; and ii) adjusting the flavor and/or fragrance dosage of the flavor and/or fragrance composition in the product by preparing the flavor and/or fragrance composition while adjusting the prescription ratio of the aroma components contained in the product based on the evaluation obtained in Step i).

Advantageous Effects of Invention

According to the present invention, it is possible to evaluate effects of aroma components contained in a product on the aromatic impression when the aroma components are released in the environment where the product is consumed, in a more suitable manner by taking the actual consumption environment into account.

For example, by employing an evaluation method of the present invention, it is possible to objectively evaluate the behavior of aroma components modeled as aromas released and transferred from a food to the nasal cavity upon consuming the food, taking change over time into account. In addition, the behavior of aroma components modeled as aromas released and inhaled from a cosmetic product into the nasal cavity can also be evaluated objectively in the same way.

According to a preferred aspect of the invention, it is easy to objectively evaluate the effects of aroma components contained in a product on the aromatic impression, and it is

DESCRIPTION OF EMBODIMENTS

Figure 1:
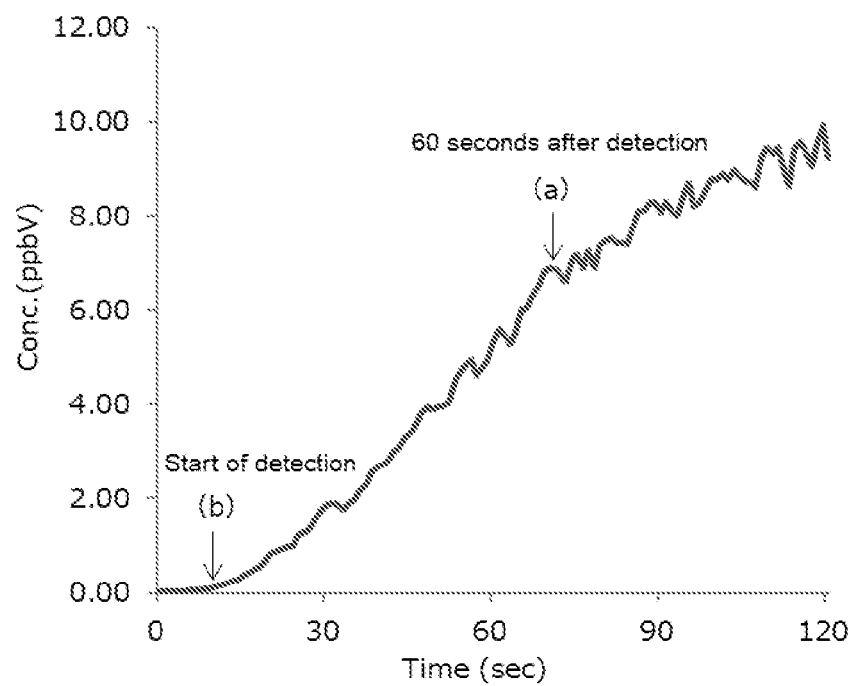
FIG. 1 shows an aromatic behavior of ethyl n-octanoate in ice-coating chocolate, obtained in Example 1.
Figure 2:
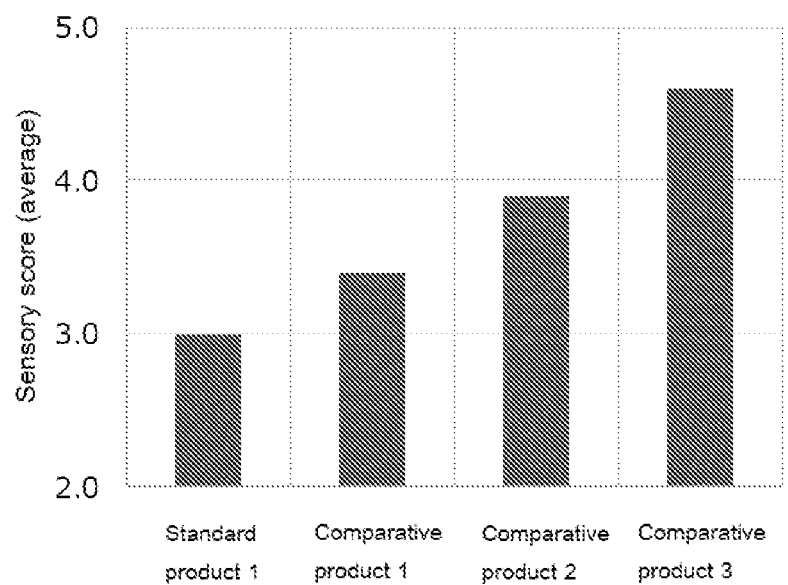
FIG. 2 shows the average scores of sensory evaluation obtained in Example 4, for comparing the intensities of aromas of the formulated flavor and/or fragrance compositions for ice-coating chocolate.

Hereinafter, the present invention will be described in detail.

1. Method for Evaluating Aroma Components

A method of the present invention for evaluating effects of aroma components contained in a product on aromatic impression when the aroma components are released in an environment where the product is consumed, comprises the steps of:

1) measuring, for each of two or more aroma components contained in the product, the rate of increase in the aroma concentration released in a given time period (quantity a of the aroma component detected after a given time period following the start of measurement/quantity b of the aroma component detected immediately after the start of detection) in an environment where the product is consumed or in a model environment thereof;

2) obtaining the magnitude relationship between the rates of increase in the aroma concentrations of the two or more aroma components obtained in Step 1); and 3) evaluating the effects of the aroma components contained in the product on the aromatic impression of the product, using the magnitude relationship between the rates of increase in the aroma concentrations of the two or more aroma components obtained in Step 2) as an index that correlates with the magnitude relationship between the magnitude of their effects on the aromatic impression of the product.

The evaluation method of the present invention aims at evaluating the effects of aroma components contained in the product on the aromatic impression when the aroma components are released in an environment where the product is consumed, in a more suitable manner by taking the actual consumption environment into account. Hereinafter, each step will be described.

In Step 1, for each of two or more aroma components contained in the product, the rate of increase in the aroma concentration released in a given time period (quantity a of the aroma component detected after a given time period following the start of measurement/quantity b of the aroma component detected immediately after the start of detection) is measured in an environment where the product is consumed or in a model environment thereof.

As used herein, "product is consumed" means that the product is ingested or used with a change in the state of the product (e.g., temperature, shape, properties, and packaging state).

The product is not particularly limited, but it is preferably a product whose commercial value is enhanced by adding aroma ingredients. According to the present invention, foods and cosmetic products are particularly preferable. Herein, the term "food" also includes beverages.

Among foods, examples of beverages include, but are not limited to: tea beverages such as green tea, powdered green tea, or black tea; soft drinks such as coffee, cocoa, carbonated drinks, fruit juices, sports drinks, and flavored water (near water); alcoholic drinks such as gin, vodka, whiskey, wine, chuhai (shochu-based alcoholic drink), sour cocktail, shochu, and sake; and beer beverages such as beer, low-malt beer, low-alcohol beer, and non-alcoholic beer. Herein, the term "beverages" also include powder-type beverages that are made into a final product by adding and mixing water or other liquid therewith.

In particular, beverages to which a flavor and/or fragrance can be added are preferred, and specifically coffee, fruit juices, sports drinks, flavored water, sour cocktails, chuhai, and beer beverages are preferred.

Moreover, examples of foods include: frozen desserts such as ice cream, sherbet, and popsicles; yogurts; Japanese and Western confectioneries; jams; candies; jellies; gums; breads; soups such as curry, stews, Japanese soups, Western soups, and Chinese soups; flavor seasonings; various instant beverages or foods; various snack foods; and nursing foods. Among these, frozen desserts, ice cream, sherbet, and yogurts are preferred. Herein, the term "food" also includes foods that are made into a final product by mixing two or more kinds of foods.

Examples of cosmetic products according to the present invention include, but not limited to, fragrance products, skin-care cosmetics, make-up cosmetics, hair cosmetics, tanning cosmetics, medicinal cosmetics, hair care products, soaps, body cleaners, bath products, detergents, softeners, cleaning agents, kitchen detergents, bleaches, aerosols, deodorants, air fresheners, repellents, toothpastes, and oral care products.

Among these, shampoos, laundry detergents, bath salts, dishwashing detergents, hair products (hair holding agents, styling agents, etc.), cosmetics (liquid body wash, body lotions, eau de cologne, powder foundations, etc.), bathroom cleaners, floor cleaners, air fresheners, deodorants (carpet deodorants, room deodorants, etc.), and window cleaners are particularly preferred.

According to the present invention, an "environment where a product is consumed" refers to an environment where the product is actually consumed. The environment where the product is consumed is suitably selected according to the kind and application of the product. The "environment where the product is consumed" includes an environment in which consumption of the product involves change in the release characteristics of the aroma components (i.e., aroma diffusion characteristics) due to interaction with other substance (hereinafter, referred to as a "first mode") and an environment in which consumption of the product does not involve change in the release characteristics of the aroma components (i.e., aroma diffusion characteristics) due to interaction with other substances (hereinafter referred to as a "second mode").

For example, if the product is a food, an "environment where the product is consumed" includes an environment in which aroma components are released and diffused when the food is heated at body temperature (35-37° C.) and the shape and properties of the food change as it mixes with other substances such as saliva when the food is being ingested (i.e., oral environment) (the first mode). In this case, the measurement of the rate of increase in the aroma concentration in Step 1) is performed in an oral cavity environment.

The first mode also includes cases, for example, powder-type beverages, where the aroma is enjoyed when the shape and properties of the beverage change as it is mixed with other substances such as water or other liquids. In this case, the measurement of the rate of increase in the aroma concentration in Step 1) is performed in an environment where the aroma components are released and diffused before being ingested, i.e., in an aroma diffusion environment. Herein, an "aroma diffusion environment" refers to an environment in which aroma components are released and diffused. For example, it includes an environment where aroma components are released and diffused by air convection.

In addition, a case where an aroma rising from a food is enjoyed when its package is opened is also included as one aspect of "consuming the product" according to the present invention. Therefore, the "environment where the product is consumed" includes an environment in which aroma components are released and diffused when use of the product involves change in the packaging condition of the product while it does not involve change in the release characteristics of the aroma components due to interaction with other substances (the second mode). Again, the measurement of the rate of increase in the aroma concentration in Step 1) is performed in an aroma diffusion environment.

If the product is a cosmetic product, the "environment where the product is consumed" refers to an environment in which the cosmetic product is actually used. In this case, other substances in the first mode are suitably selected according to the kind and application of the cosmetic product. Examples of other substances include one or more selected from the group consisting of water, hair, skin, bathtub, floor, cloth, and glass.

For example, if the cosmetic product is a shampoo, liquid body wash, or any of various detergents (including dishwashing detergents, laundry detergents, etc.), the environment includes an environment where the aroma components are released when the cosmetic product is used while changing its shape and properties as it mixes with water, i.e., other substance, and foams up (the first mode).

If the cosmetic product is a cosmetic (including make-up, skin care, body and hair cosmetics, etc.) or a perfume (including parfum, eau de parfum, eau de toilette, eau de cologne, etc.), the environment includes an environment where the aroma components are released as the shape, temperature, and properties change when they are applied to the skin (including scalp) or hair i.e., other substances, and interact with the skin (including scalp) or hair (the first mode).

In the case of cleaners (including bathroom cleaners, floor cleaners, window cleaners, etc.), the environment includes an environment where the aroma components are released as the shape, temperature, and properties change when they are applied to the object to be treated and interact with the object to be treated (the first mode).

In addition, if the cosmetic product is an air freshener or deodorant, the environment includes an environment where the aroma components are released as the shape, temperature, and properties change when they are applied to the cloth or carpet and interact with the cloth or carpet (the first mode).

Furthermore, if the cosmetic product is a volatile air freshener, the environment includes an environment where the aroma components are released as the shape, temperature, and properties change when the product is placed indoors or in a car (the second mode).

In addition, a case where an aroma rising from a cosmetic product is enjoyed upon opening its package is also included as one aspect of "consuming the product" according to the present invention. Therefore, the "environment where the product is consumed" includes an environment in which aroma components are released when use of the product involves change in the packaging condition of the product, while it does not involve change in the release characteristics of the aroma components attributed to interaction with other substances (the second mode).

If the product is a cosmetic product, the measurement of the rate of increase in the aroma concentration in Step 1) is performed in an environment where the aroma components are released and diffused, i.e., in an aroma diffusion environment.

According to the present invention, instead of the environment where the product is consumed, a model environment that artificially reproduces the environment where the product is consumed may be constructed and used. If it is difficult to measure the rate of increase in the aroma concentration in the environment where the product is consumed, a model environment is constructed and the rate of increase in the aroma concentration is measured in this model environment in Step 1).

The model environment can be constructed by placing a product sample (sample) and other substance into a container in a given quantity ratio. It is preferable to keep the temperatures of the container and the inside of the container under the same temperature conditions as those of the environment where the product is consumed.

For example, if the product is a food, other substance may be human or artificial saliva, and the environment where the product is consumed may be an oral cavity model environment.

Alternatively, the product may be a cosmetic product, and the measurement of the rates of increase in the aroma concentrations of the aroma components may be performed in an aroma diffusion environment.

In Step 1), for each of two or more aroma components contained in the product, the rate of increase in the aroma concentration released in a given time period (quantity a of the aroma component detected after a given time period following the start of measurement/quantity b of the aroma component detected immediately after the start of detection) in an environment where the product is consumed or in a model environment thereof.

A flavor and/or fragrance, or a compound thereof used as aroma components according to the present invention is not particularly limited, and may be any flavor and/or fragrance contained in plants and animals that can be used as an aroma ingredient for foods or any flavor and/or fragrance that can be added as a food additive. Examples include flavors and fragrances listed in Common and Conventional Techniques (Flavors and Fragrances) Part II: Flavors and Fragrances for Foods, JPO Publication (Japan Patent Office), Collection of Base Materials for Natural Flavors and Fragrances (Japan Flavor and Fragrance Materials Association), and Synthetic Flavors and Fragrances (Chemical Daily Co., Ltd.).

According to the present invention, a "predetermined time period" refers to a time period from the start of the measurement to the end of a predetermined time period. The starting time and the time period can be selected appropriately according to the desired aroma diffusion behavior of the product, taking the kind and application of the product into account. In one preferred embodiments of the present invention, the time immediately after the start of detection may be considered as the start of measurement. Here, "immediately after the start of detection" means immediately after the aroma component of interest is detected in a detectable amount with the instrument used. For example, in a case of a product such as iced chocolate that require time for the aroma to diffuse, it is preferable to select a time period that allows the product to sufficiently melt in the oral cavity for the aroma to diffuse. For a product for which the aroma rising upon opening its package is important, the measurement should be started immediately after the package is opened and the time period should be set shorter.

According to the present invention, the "rate of increase in the aroma concentration" is defined as "quantity a of the aroma component detected after a given time period following the start of measurement/quantity b of the aroma component detected immediately after the start of detection". According to the present invention, the rate of increase in the aroma concentration is determined for each of two or more aroma components. By determining the rate of increase in the aroma concentration for each aroma component in this way, the effect of each aroma component on the aromatic impression can be evaluated more appropriately without overlooking the diffusion characteristics of aroma components that significantly increase in a given time period even if their detected quantities are small.

Note that a solvent contained in the product, for example, a solvent contained in the flavor and/or fragrance composition in order to dilute the formulated flavor and/or fragrance or to increase solubility of the formulated flavor and/or fragrance in the product, is not considered upon calculating the rate of increase in the aroma concentration since it is almost odorless by itself.

Examples of solvents that are not considered in the calculation of the rate of increase in the aroma concentration include dipropylene glycol (3-(3-hydroxypropoxy)propane-1-ol); propylene glycol (propane-1,2-diol); triethyl citrate (triethyl 2-hydroxypropane-1,2,3-tricarboxylate); isopropyl myristate (propane-2-yl tetradecanoate); dimethyl isosorbide (3,6-dimethoxy-2,3,3a,5,6,6a-hexahydrofuro [3,2-b] furan); water; ethanol; isopropanol (ethane-1-ol); diethyl phthalate (diethylbenzene-1,2-dicarboxylate); dipropylene glycol dimethyl ether (1-methoxy-3-(3-methoxypropoxy) propane); dipropylene glycol methyl ether (3-(3-methoxypropoxy)propane-1-ol); dipropylene glycol methyl ether acetate (1-((1-methoxypropane-2-yl)oxy)propane-2-yl acetate); dipropylene glycol n-butyl ether (14(1-butoxypropane-2-yl)oxy)propane-2-01); propylene glycol methyl ether (1-methoxypropane-2-01); propylene glycol n-butyl ether (1-butoxypropane-2-ol); propylene glycol n-propyl ether (1-propoxypropane-2-ol); tripropylene glycol methyl ether (1-((1-((1-methoxypropane-2-yl)oxy)propane-2-yl) oxy)propane-2-ol); dipropylene glycol dimethyl ether (2-methoxy-1-((1-methoxypropane-2-yl)oxy)propane); isoparaffinic hydrocarbon oils such as C8-C9 isoparaffin, C8-C12 isoparaffin, C10-11 isoparaffin, C10-12 isoparaffin, C12-C14 isoparaffin, C11-C16 isoparaffin, and C12-C20 isoparaffin; dimethyl glutarate; dimethyl succinate; dimethyl adipate; and isopropylidene glycerol (2,2-dimethyl-1,3-dioxolane-4-methanol).

Hereinafter, an embodiment of a method for measuring the "rate of increase in the aroma concentration" will be described in detail.

First, an environment where the product is consumed or a model environment thereof is constructed in a container for diffusing the aroma released from a product, and a sample of the product is placed in this environment. In a case where a sample of a product such as a cosmetic product that is to be applied to human skin cannot be placed in a container, an environment where the product is consumed or a model environment thereof can be constructed by covering an object treated with the sample of the product (for example, a human hand or arm to which the cosmetic product has been applied) with a container.

The container for diffusing the aroma released from the product is not limited, but it is preferably made of glass. The volume of the container is preferably 10-1,000 ml, more preferably 100-1,000 ml, and still more preferably 300-500 ml. Moreover, a container having two or more ports is desirable. Preferably, the container is separately provided with a feed port for feeding the sample and an outlet port for collecting the aroma components or introducing them to the instrument. In a case where a sample of a product cannot be fed into the container, the feed port is preferably shaped in such a way that the container can sufficiently cover an object treated with the sample of the product (for example, a human hand or arm to which the cosmetic product has been applied) with the container.

In one embodiment of the invention, the feed port preferably allows air flow. In this case, convection currents of air introduced into the container through the feed port for feeding the sample diffuse the aroma released from the product in the container, and the aroma components can be collected through the outlet port or introduced into the instrument.

The temperatures of the container and the inside of the container are not particularly limited, but it is preferable to keep the temperatures close to those of the environment where the product is consumed and it is preferable to use a method that can be controlled with good reproducibility. For example, for a cosmetic product used at room temperature, it is preferable to keep the container at 23-25° C. by using a thermostatic bath or oil bath. Similarly, for a food product, it is preferable to keep the container at 35-37° C., which is about body temperature.

If the product is a cosmetic product that is foamed up upon use, such as a shampoo or any of various detergents (including dishwashing detergent, laundry detergent, etc.), water and a stirrer are placed in the container in advance. Although it is not particularly limited, water is preferably tap water and the stirrer preferably has a shape that mixes the sample well with water. The amount of water depends on the sample, and it is preferably used in a volume ratio that allows the sample to foam up easily and that is close to that in the situation in which the sample will be used. A digital stirrer with good reproducibility is preferably used for stirring, with a rotational speed of preferably 100 rpm or more, more preferably 200-1000 rpm, and still more preferably 500-700 rpm.

If the product is a cosmetic product that is to be applied to hair, such as a hair holding agent or styling agent, hair that has been applied with the cosmetic product beforehand may be placed in the container or the cosmetic product may be fed after hair is placed in the container. Although it is not particularly limited, the hair may be human or artificial hair. The amount of hair is preferably 0.1 g or more, and more preferably 0.5-2.0 g.

If the product is a cosmetic product that is to be applied to human skin, such as liquid body wash, body lotion, perfume, cosmetics, etc., the preferable procedure includes, but is not limited to, applying the sample to a human hand or arm and covering the applied part with a container. The coating area is preferably 1 cm$^2$ or larger, and more preferably 4-25 cm$^2$.

If the product is a cleaner (including bathroom cleaner, floor cleaner, window cleaner, etc.), a tile or sheet to be treated is placed in the container in advance. The area of the tile or sheet is preferably 1 cm$^2$ or larger, and more preferably 4-25 cm$^2$.

If the product is a volatile air freshener or the like, the sample is fed directly into the above-described container.

When evaluating an aroma that rises upon opening a cosmetic product, a sample taken out of a sealed sample-storing container is directly fed into the above container. Alternatively, the above container is partitioned so that it is filled with the aroma components, and the partition is removed at the start of the measurement.

When a food is used as a sample, human saliva or artificial saliva and a stirrer are placed in the container beforehand. Although it is not particularly limited, the artificial saliva with good reproducibility is preferable, and α-amylase, mucin, and one or more inorganic salts are preferably contained in the artificial saliva. The amount of human saliva or artificial saliva is preferably 0.1 g or more, more preferably 0.2-1.0 g, and still more preferably 0.4-0.6 g per 1.0 g of the sample. A digital stirrer with good reproducibility is preferably used for stirring, with a rotational speed of preferably 100 rpm or more, more preferably 200-400 rpm, and still more preferably 250-300 rpm.

When evaluating the aroma that rises upon opening a food package, a sample taken out of a sealed sample-storing container is directly put into the above container. Alternatively, the above container is partitioned so that it is filled with the aroma components, and the partition is removed at the start of the measurement.

While a method for analyzing the aroma components released from the product is not particularly limited, an efficient analysis can be performed using a gas chromatograph, mass spectrometer, or detector.

In addition, a real-time measurement device that can capture minute changes in the behavior of aroma components released from the sample is preferred. One example of such an instrument is the proton transfer reaction mass spectrometer PTR-TOFMS (IONICON Analytik GmbH).

For example, in a case of chocolate for ice coating, a container pre-filled with artificial saliva is kept at about body temperature (35-37° C.) and then measurement of aroma components is started using an instrument. A sample is fed into the sample container through the feed port, and the aroma components released as the sample is mixed with and dissolved in the artificial saliva by the stirrer are continuously detected for a certain period of time.

From the behavior of the continuously increasing aroma concentration obtained by instrumental analysis, the ratio (a/b) of quantity (a) detected at any given time to quantity (b) detected immediately after the start of detection is obtained, which is defined as the rate of increase in the aroma concentration and calculated for each aroma component.

Next, in Step 2), the magnitude relationship between the rates of increase in the aroma concentrations of two or more aroma compounds obtained in Step 1) is obtained. Herein, the term "magnitude relationship" means a relative magnitude relationship between the rates of increase in the aroma concentrations of two or more aroma components.

Furthermore, the magnitude relationship between the rates of increase in the aroma concentrations may be the relative magnitude relationship between the rates of increase in the aroma concentrations of any two or more aroma components contained in the product. In other words, the magnitude relationship between the rates of increase in the aroma concentrations does not have to be obtained for all of the aroma components but may be obtained only for at least some of the aroma components contained in the product. For example, it is possible to obtain the magnitude relationship by measuring the rates of increase in the aroma concentrations only for specific aroma components that are of interest upon formulating a flavor and/or fragrance composition, for example, aroma components that largely contribute to an aroma to be obtained or aroma components with low threshold values.

In Step 3), the effects of the aroma components contained in the product on the aromatic impression of the product are evaluated using the magnitude relationship between the rates of increase in the aroma concentrations of two or more aroma components obtained in Step 2) as an index that correlates with the magnitude relationship between the magnitude of their effects on the aromatic impression of the product. Here, the term "magnitude relationship" refers to the relative magnitude relationship of the effects of two or more aroma components on the aromatic impression of the product. For example, one aroma component with a larger increase in the aroma concentration among two aroma components has a larger effect on the aromatic impression of the product, while one aroma component with a smaller increase in the aroma concentration among the two aroma components has a smaller effect on the aromatic impression of the product.

The rate of increase in the aroma concentration varies depending on the base used as the sample, and also on the measurement conditions. However, by setting a model environment and measurement conditions according to the kind and application of the product, and comparing the rates of increase in the aroma concentrations between the aroma components under the same conditions, it is possible to use the magnitude relationship between the rates of increase in the aroma concentrations of two or more aroma components as an index that correlates with the magnitude relationship between their effects on the aromatic impression perceived by people in the environment where the sample is consumed, i.e., used or eaten.

According to the present invention, by using the magnitude relationship between the rates of increase in the aroma concentrations of two or more aroma components in a product as an index that correlates with the magnitude relationship between their effects on the aromatic impression, the aroma diffusion characteristics of each aroma component can be evaluated practically and objectively while eliminating the influence attributed to the magnitude of the detected quantity.

According to a preferred aspect of the present invention, when formulating a flavor and/or fragrance composition, the aroma components are evaluated using the evaluation method of the present invention, and based on this evaluation, the kinds and prescription ratio of the aroma components can be selected to control the expression of the retronasal aroma or the aroma diffusion characteristics according to the kind and application of the product.

For example, since an aroma component with a relatively large increase in the aroma concentration can be evaluated to have a relatively large effect on the aromatic impression of the product, it is possible to control the aromatic impression of the product by increasing or reducing the amount of this aroma component. Alternatively, the amount of an aroma component with a relatively small increase in the aroma concentration can be reduced or not formulated in the formulated flavor and/or fragrance, since its effect on the aromatic impression of the product can be evaluated as relatively small. In addition, if one wants to give an effect on the aromatic impression, it is necessary to increase the amount of that aroma component significantly.

2. Method for Preparing Flavor and/or Fragrance Composition

A method for preparing a flavor and/or fragrance composition of the present invention comprises the steps of:

A) evaluating effects of aroma components contained in a product on the aromatic impression when the aroma components are released in an environment where the product is consumed, by the above-described evaluation method; and B) preparing a flavor and/or fragrance composition by adjusting the prescription ratio of the aroma components contained in the product based on the evaluation obtained in step A).

In step A), the effects of the aroma components contained in the product on the aromatic impression when the aroma components are released in an environment where the product is consumed are evaluated by the method for evaluating aroma components according to the present invention. The method for evaluating the aroma components according to the present invention is described in "1. Method for evaluating aroma components".

In Step B), the prescription ratio of the aroma components in the flavor and/or fragrance composition used for the product is adjusted by increasing or decreasing the ratio of the amount(s) of the aroma component(s) which has been defined to have significant effect(s) on the aromatic impression of the product. According to the present invention, it is easy to control the effect of a flavor and/or fragrance composition on the aromatic impression of a product when the flavor and/or fragrance composition is used in the product by increasing or decreasing the ratio of the amount(s) of the aroma component(s) that has been defined to have significant effect(s) on the aromatic impression of the product. According to the present invention, it is easy to prepare a flavor and/or fragrance composition that is more suitable for a product by taking the environment where the product is actually consumed into account. According to a preferred aspect of the present invention, the expression of the retronasal aroma when a food is consumed and the diffusion of aroma from a cosmetic product can be controlled more easily, and a flavor and/or fragrance composition of interest can be provided in an efficient manner according to the kind and application of the product. In addition, according to a preferred aspect of the present invention, it is also possible to provide, in a more efficient manner, a product with a more controlled retronasal aroma expression upon consuming a food and more controlled diffusion of aroma from a cosmetic product.

3. Method for Adjusting Flavor and/or Fragrance Dosage of Flavor and/or Fragrance Composition in Product A method of the present invention for adjusting a flavor and/or fragrance dosage of a flavor and/or fragrance composition in a product comprises the steps of:

i) evaluating effects of aroma components contained in the product on the aromatic impression when the aroma components are released in an environment where the product is consumed, by the above-described evaluation method; and ii) adjusting the flavor and/or fragrance dosage of the flavor and/or fragrance composition in the product by preparing the flavor and/or fragrance composition while adjusting the prescription ratio of the aroma components contained in the product based on the evaluation obtained in Step i).

In Step i), the effects of the aroma components contained in the product on the aromatic impression when the aroma components are released in an environment where the product is consumed are evaluated by the method for evaluating aroma components according to the present invention. The method for evaluating the aroma components according to the present invention is described in "1. Method for evaluating aroma components".

In Step ii), the prescription ratio of the aroma components in the flavor and/or fragrance composition used for the product is adjusted by increasing or decreasing the ratio of the amount(s) of the aroma component(s) which has been defined to have significant effect(s) on the aromatic impression of the product. According to the present invention, it is possible to adjust a flavor and/or fragrance dosage of a flavor and/or fragrance composition in a product when using the flavor and/or fragrance composition in the product by increasing or decreasing the ratio of the amount(s) of the aroma component(s) that have been defined to have significant effect(s) on the aromatic impression of the product. In a preferred aspect of the present invention, the expression of the retronasal aroma when a food is consumed and the diffusion of aroma from a cosmetic product can be controlled more easily and thus a flavor and/or fragrance composition with good aroma can be prepared according to the kind and application of the product, thereby reducing the flavor and/or fragrance dosage of the flavor and/or fragrance composition in the product.

EXAMPLES

Hereinafter, the present invention will be further described in detail by means of examples, but the present invention is not limited to these examples. In the following examples, "%" is on a mass basis unless otherwise stated.

Aroma components diffusing in the headspace in a model environment where an oral or cosmetic product was to be used were introduced into a proton transfer reaction mass spectrometer PTR-TOFMS (manufactured by IONICON Analytik GmbH) to obtain concentrations of the specified ions. The essential PTR-TOFMS measurement conditions are shown in Table 1.

TABLE 1

| Setting items | Input value |
| --- | --- |
| T-Drift (° C.) | 120 |
| Inlet Temp. (° C.) | 180 |
| FC Inlet (sccm) | 50 |
| E/N | 90 |
| Single Spec Time (ms) | 1,000 |

Example 1

A formulated flavor and/or fragrance base composition for ice-coating chocolate (Reference product 1) was prepared, which consisted of flavor and/or fragrance compounds contained in chocolate. The formulation of Reference product 1 is shown in Table 2.

TABLE 2

<Formulation of Reference product 1>

| Name of aroma compound | Prescription amount (parts by mass) |
|---|---|
| 2,3,5-Trimethylpyrazine | 1.0 |
| 2,4,5-Trimethylthiazole | 0.5 |
| 2-Phenyl-5-methyl-2-hexenal | 10.0 |
| 2-Phenylethyl alcohol | 2.0 |
| 4-Vinyl-2-methoxyphenol | 10.0 |
| Ethyl n-octanoate | 2.0 |
| Isobutyric acid | 0.5 |
| Isoamyl acetate | 0.5 |
| Isobutyl phenylacetate | 2.0 |
| Triacetin | 71.5 |
| Total | 100.0 |

To a mixed base of commercially available Couverture Sweet chocolate (58% cacao) and commercially available rapeseed oil at a ratio of 7:3, Reference product 1 was added in an amount of 0.1% or 0.3% relative to the total amount of the base, and the resultant was cooled to −15° C. or below to give a sample. The aroma concentrations of the flavor and/or fragrance compounds, which were released as the above sample was dissolved upon mixing 0.8 g of the sample and 0.4 g of artificial saliva (containing 0.22% mucin, 0.004% α-amylase, 0.50% $CaCl_2$) $(H_2O)_2$, and 99.05% water; the same composition was also employed in the rest of the examples), were determined with PTR-TOFMS. The measurement time was approximately 2 minutes after sample loading.

The rate of increase in the aroma concentration (a/b) was calculated, where b was the aroma concentration immediately after the detection of the continuously increasing aroma concentration obtained as a result of the measurement, and a was the concentration 60 seconds after b. The same measurements were performed multiple times, and the rates of increase in the aroma concentrations were averaged over the number of times of the measurements. The rates of increase in the aroma concentrations of the flavor and/or fragrance compounds composing Reference product 1 are shown in Table 3.

TABLE 3

| Name of aroma compound | Rate of increase in concentration | |
|---|---|---|
| | 0.1% addition | 0.3% addition |
| 2,4,5-Trimethylthiazole | 29.9 | 31.3 |
| 2,3,5-Trimethylpyrazine | 20.7 | 22.1 |
| Ethyl n-octanoate | 12.1 | 11.8 |
| 2-Phenylethyl alcohol | 10.6 | 9.5 |
| 4-Vinyl-2-methoxyphenol | 6.5 | 6.4 |
| 2-Phenyl-5-methyl-2-hexenal | 6.1 | 6.1 |
| Isoamyl acetate | 5.8 | 5.9 |
| Isobutyl phenylacetate | 4.3 | 5.7 |
| Isobutyric acid | 3.4 | 5.5 |

As shown in Table 3, the rates of increase in the aroma concentrations were almost independent of the amounts added in Reference product 1. This result indicates that the rate of increase in the aroma concentration can serve as an index for evaluating the aroma diffusion characteristic of each aroma component while eliminating the influence attributed to the magnitude of the detected quantity.

The aromatic behavior of ethyl n-octanoate in ice-coating chocolate is shown in FIG. 1.

Example 2

Flavor and/or fragrance base compositions for strawberry (Reference products 2 and 3) were prepared, which consisted of flavor and/or fragrance compounds contained in strawberry. The formulations of Reference products 2 and 3 are shown in Tables 4 and 5, respectively.

TABLE 4

<Formulation of Reference product 2>

| Name of aroma compound | Prescription amount (parts by mass) |
|---|---|
| α-Ionone | 2.0 |
| Ethyl isovalerate | 0.1 |
| Furaneol | 5.0 |
| Ethyl butyrate | 0.1 |
| Triacetin | 92.8 |
| Total | 100.0 |

TABLE 5

<Formulation of Reference product 3>

| Name of aroma compound | Prescription amount (parts by mass) |
|---|---|
| Ethyl 2-methylbutyrate | 0.1 |
| Cis-3-hexene-1-ol | 1.0 |
| γ-Decalactone | 5.0 |
| Damascenone | 1.0 |
| Hexanoic acid | 5.0 |
| Triacetin | 87.9 |
| Total | 100.0 |

To an ice cream base consisting of a mixture of 22 g of raw milk, 12.6 g of raw cream (35% milk fat), 7.4 g of skimmed milk powder, 8.4 g of starch syrup, 11.6 g of granulated sugar, and 38 g of dissolving water, References product 2 and 3 were added in an amount of 0.1% relative to the total amount of the base, respectively, and the resultant was cooled to −15° C. or below to give a sample. The aroma concentrations of the flavor and/or fragrance compounds, which were released as the above sample was dissolved upon mixing 0.8 g of the above sample and 0.4 g of artificial saliva, were determined with PTR-TOFMS. The measurement time was approximately 2 minutes after sample loading.

The rate of increase in the aroma concentration (a/b) was calculated, where b was the aroma concentration immediately after the detection of the continuously increasing aroma concentration obtained as a result of the measurement, and a was the concentration 60 seconds after b. The same measurements were performed multiple times, and the rates of increase in the aroma concentrations were averaged over the number of times of the measurements. The rates of increase in the aroma concentrations of the flavor and/or fragrance compounds composing Reference products 2 and 3 are shown in Table 6.

TABLE 6

| Name of aroma compound | Rate of increase in concentration |
|---|---|
| Ethyl 2-methylbutyrate | 12.7 |
| Ethyl isovalerate | 12.1 |
| Damascenone | 10.3 |
| Ethyl butyrate | 8.9 |
| α-Ionone | 7.9 |
| Cis-3-hexene-1-ol | 4.8 |
| Hexanoic acid | 4.0 |
| γ-Decalactone | 3.7 |
| Furaneol | 2.6 |

Example 3

To a base of a commercially available plain yogurt (9.5% nonfat milk solids, 3.0% milk fat), granulated sugar was added in amount of 7%, and Reference product 2 and 3 were added in amount of 0.1%, respectively, relative to the total amount of the base, and the resultant was cooled to 5° C. to give a sample. The aroma concentrations of the flavor and/or fragrance compounds, which were released as the above sample was dissolved upon mixing 1.0 g of the sample and 0.5 g of artificial saliva, were determined with PTR-TOFMS. The measurement time was approximately 2 minutes after sample loading.

The rate of increase in the aroma concentration (a/b) was calculated, where b was the aroma concentration immediately after the detection of the continuously increasing aroma concentration obtained as a result of the measurement, and a was the concentration 30 seconds after b. The same measurements were performed multiple times, and the rates of increase in the aroma concentrations were averaged over the number of times of the measurements. The rates of increase in the aroma concentrations of the flavor and/or fragrance compounds composing Reference products 2 and 3 are shown in Table 7.

TABLE 7

| Name of aroma compound | Rate of increase in concentration |
|---|---|
| α-Ionone | 14.7 |
| Ethyl isovalerate | 7.8 |
| Ethyl butyrate | 7.7 |
| Ethyl 2-methylbutyrate | 6.5 |
| Damascenone | 5.8 |
| Cis-3-hexene-1-ol | 4.8 |
| Hexanoic acid | 1.6 |
| γ-Decalactone | 1.1 |
| Furaneol | 1.0 |

Next, the following tests were conducted to verify the validity of the rate of increase in the aroma concentration.

Example 4

A formulated flavor and/or fragrance composition for ice-coating chocolate (Standard product 1) was prepared, which consisted of flavor and/or fragrance compounds contained in chocolate. With respect to the rates of increase in the aroma concentrations of the aroma components in the ice-coating chocolate, the flavor and/or fragrance compounds of Standard product 1 were classified into those with higher increase rates, those with moderate increase rates, and those with lower increase rates, and then formulated flavor and/or fragrance compositions (Comparative products 1-3) were prepared by only changing the amounts of the flavor and/or fragrance compounds of one group upon formulation. Comparative product 1 was a formulated flavor and/or fragrance composition in which the amounts of the flavor and/or fragrance compounds with lower rates of increase in the aroma concentrations were changed upon formulation; Comparative product 2 was a formulated flavor and/or fragrance composition in which the amounts of the flavor and/or fragrance compounds with moderate rates of increase in the aroma concentrations were changed upon formulation; Comparative product 3 was a formulated flavor and/or fragrance composition in which the amounts of the flavor and/or fragrance compounds with higher rates of increase in the aroma concentrations were changed upon formulation. The formulations of Standard product 1 and Comparative products 1-3 are shown in Table 8.

TABLE 8

| Name of aroma compound | Standard product 1 | Comparative product 1 | Comparative product 2 | Comparative product 3 |
|---|---|---|---|---|
| 2,4,5-Trimethylthiazole | 1.0 | 1.0 | 1.0 | 6.0 |
| 2,3,5-Trimethylpyrazine | 1.0 | 1.0 | 1.0 | 6.0 |
| Ethyl n-octanoate | 1.0 | 1.0 | 1.0 | 6.0 |
| 2-Phenyl-5-methyl-2-hexenal | 1.0 | 1.0 | 6.0 | 1.0 |
| 2-Phenylethyl alcohol | 1.0 | 1.0 | 6.0 | 1.0 |
| 4-Vinyl-2-methoxyphenol | 1.0 | 1.0 | 6.0 | 1.0 |
| Isoamyl acetate | 1.0 | 6.0 | 1.0 | 1.0 |
| Isobutyric acid | 1.0 | 6.0 | 1.0 | 1.0 |
| Isobutyl phenylacetate | 1.0 | 6.0 | 1.0 | 1.0 |
| Triacetin | 91.0 | 76.0 | 76.0 | 76.0 |
| Total | 100.0 | 100.0 | 100.0 | 100.0 |

(Sensory Evaluation)

Five experienced panelists performed sensory evaluation in terms of the intensity of the aroma upon consuming iced chocolates (about 1.5 g) that contained one of the formulated flavor and/or fragrance compositions for ice-coating chocolate (Standard product 1 and Comparative products 1-3) in an amount of 0.1%. The intensity of the aroma was evaluated as a relative intensity (9 levels in increments of 0.5) to that of Standard product 1. The evaluation criteria are shown below.

Evaluation Criteria
Score
  5 points: Sensed stronger
  4 points: Sensed slightly stronger
  3 points: Sensed the same
  2 points: Sensed slightly weaker
  1 point: Sensed weaker Standard product 1 and each comparison product were taken as one set, and they were consumed in such an order that Standard product 1 was consumed every time just before the comparison product was consumed. The score was written on given evaluation paper. The simple average of the scores from the five panelists is shown in Table 9.

TABLE 9

| Standard product 1 | Comparative product 1 | Comparative product 2 | Comparative product 3 |
|---|---|---|---|
| 3.0 | 3.4 | 3.9 | 4.6 |

When the intensity of the aroma of each comparative product was compared to that of Standard product 1 (FIG.

2), the scores of the comparative products containing increased amounts of the flavor and/or fragrance compounds with larger rates of increase in the aroma concentrations tended to be higher. This result indicates that the rate of increase in the aroma concentration obtained by the evaluation method of the present invention is useful as an index of the effect on the flavor, and that the evaluation method of the present invention is a useful method for solving the problem.

Example 5

A formulated flavor and/or fragrance composition for strawberry (Standard product 2) was prepared, which consisted of flavor and/or fragrance compounds contained in strawberry. With respect to the rates of increase in the aroma concentrations of the aroma components in ice cream, the flavor and/or fragrance compounds of Standard product 2 were classified into those with higher increase rates, those with moderate increase rates, and those with lower increase rates, and then formulated flavor and/or fragrance compositions (Comparative products 4-6) were prepared by only changing the amounts of the flavor and/or fragrance compounds of one group upon formulation. Comparative product 4 was a formulated flavor and/or fragrance composition in which the amounts of the flavor and/or fragrance compounds with lower rates of increase in the aroma concentrations were changed upon formulation; Comparative product 5 was a formulated flavor and/or fragrance composition in which the amounts of the flavor and/or fragrance compounds with moderate rates of increase in the aroma concentrations were changed upon formulation; Comparative product 6 was a formulated flavor and/or fragrance composition in which the amounts of the flavor and/or fragrance compounds with higher rates of increase in the aroma concentrations were changed upon formulation. The formulations of Standard product 2 and Comparative products 4-6 are shown in Table 10.

TABLE 10

| Name of aroma compound | Standard product 2 | Comparative product 4 | Comparative product 5 | Comparative product 6 |
|---|---|---|---|---|
| Ethyl 2-methylbutyrate | 1.0 | 1.0 | 1.0 | 3.0 |
| Ethyl isovalerate | 1.0 | 1.0 | 1.0 | 3.0 |
| Damascenone | 1.0 | 1.0 | 1.0 | 3.0 |
| Ethyl butyrate | 1.0 | 1.0 | 3.0 | 1.0 |
| α-Ionone | 1.0 | 1.0 | 3.0 | 1.0 |
| Cis-3-hexene-1-ol | 1.0 | 1.0 | 3.0 | 1.0 |
| Hexanoic acid | 1.0 | 3.0 | 1.0 | 1.0 |
| γ-Decalactone | 1.0 | 3.0 | 1.0 | 1.0 |
| Furaneol | 1.0 | 3.0 | 1.0 | 1.0 |
| Triacetin | 91.0 | 85.0 | 85.0 | 85.0 |
| Total | 100.0 | 100.0 | 100.0 | 100.0 |

(Sensory Evaluation)

Five experienced panelists performed sensory evaluation in terms of the intensity of the aroma upon consuming ice cream (about 3 g) that contained one of the formulated flavor and/or fragrance compositions for strawberry (Standard product 2 and Comparative products 4-6) in an amount of 0.1%. The intensity of the aroma was evaluated as a relative intensity (9 levels in increments of 0.5) to that of Standard product 2. The evaluation criteria are shown below.

Evaluation Criteria

Score 5 points: Sensed stronger 4 points: Sensed slightly stronger 3 points: Sensed the same 2 points: Sensed slightly weaker 1 point: Sensed weaker Standard product 2 and each comparison product were taken as one set, and they were consumed in such an order that Standard product 2 was consumed every time just before the comparison product was consumed. The score was written on given evaluation paper. The simple average of the scores from the five panelists is shown in Table 11.

TABLE 11

| Standard product 2 | Comparative product 4 | Comparative product 5 | Comparative product 6 |
|---|---|---|---|
| 3.0 | 3.4 | 3.7 | 4.0 |

Figure 3:
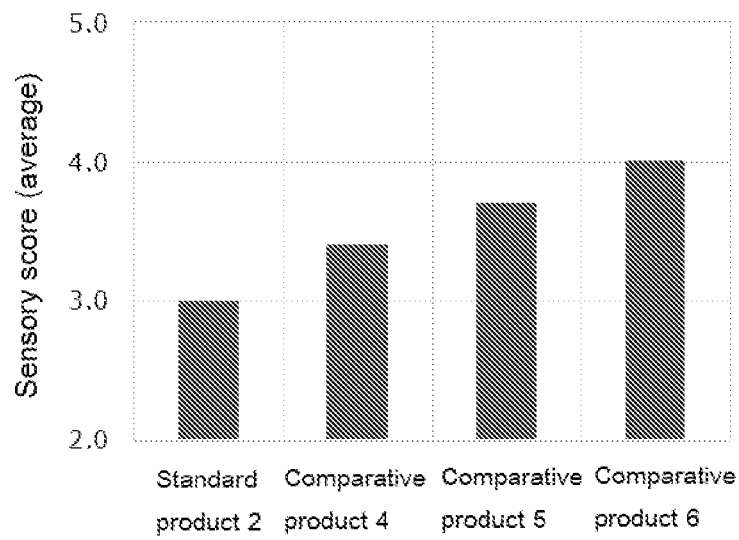
FIG. 3 shows the average scores of sensory evaluation obtained in Example 5, for comparing the intensities of aromas of the formulated flavor and/or fragrance compositions for ice cream.

When the intensity of the aroma of each comparative product was compared to that of Standard product 2 (FIG. 3), the scores of the comparative products containing increased amounts of the flavor and/or fragrance compounds with larger rates of increase in the aroma concentrations tended to be higher. This result indicates that the rate of increase in the aroma concentration obtained by the evaluation method of the present invention is useful as an index of the effect on the flavor, and further that the evaluation method of the present invention is a useful method for solving the problem.

Example 6

A formulated flavor and/or fragrance composition for strawberry (Standard product 2) was prepared, which consisted of flavor and/or fragrance compounds contained in strawberry. With respect to the rates of increase in the aroma concentrations of the aroma components in yogurt, the flavor and/or fragrance compounds of Standard product 2 were classified into those with higher increase rates, those with moderate increase rates, and those with lower increase rates, and then formulated flavor and/or fragrance compositions (Comparative products 7-9) were prepared by only changing the amounts of the flavor and/or fragrance compounds of one group upon formulation. Comparative product 7 was a formulated flavor and/or fragrance composition in which the amounts of the flavor and/or fragrance compounds with lower rates of increase in the aroma concentrations were changed upon formulation; Comparative product 8 was a formulated flavor and/or fragrance composition in which the amounts of the flavor and/or fragrance compounds with moderate rates of increase in the aroma concentrations were changed upon formulation; Comparative product 9 was a formulated flavor and/or fragrance composition in which the amounts of the flavor and/or fragrance compounds with higher rates of increase in the aroma concentrations were changed upon formulation. The formulations of Standard product 2 and Comparative products 7-9 are shown in Table 12.

TABLE 12

| Name of aroma compound | Standard product 2 | Comparative product 7 | Comparative product 8 | Comparative product 9 |
|---|---|---|---|---|
| α-Ionone | 1.0 | 1.0 | 1.0 | 3.0 |
| Ethyl isovalerate | 1.0 | 1.0 | 1.0 | 3.0 |
| Ethyl butyrate | 1.0 | 1.0 | 1.0 | 3.0 |
| Ethyl 2-methylbutyrate | 1.0 | 1.0 | 3.0 | 1.0 |
| Damascenone | 1.0 | 1.0 | 3.0 | 1.0 |
| Cis-3-hexene-1-ol | 1.0 | 1.0 | 3.0 | 1.0 |
| Hexanoic acid | 1.0 | 3.0 | 1.0 | 1.0 |
| γ-Decalactone | 1.0 | 3.0 | 1.0 | 1.0 |
| Furaneol | 1.0 | 3.0 | 1.0 | 1.0 |
| Triacetin | 91.0 | 85.0 | 85.0 | 85.0 |
| Total | 100.0 | 100.0 | 100.0 | 100.0 |

(Sensory Evaluation)

Five experienced panelists performed sensory evaluation in terms of the intensity of the aroma upon consuming yogurt (about 3 g) that contained one of the formulated flavor and/or fragrance compositions for strawberry (Standard product 2 and Comparative products 7-9) in an amount of 0.03%. The intensity of the aroma was evaluated as a relative intensity (9 levels in increments of 0.5) to that of Standard product 2. The evaluation criteria are shown below.

Evaluation Criteria

Score 5 points: Sensed stronger 4 points: Sensed slightly stronger 3 points: Sensed the same 2 points: Sensed slightly weaker 1 point: Sensed weaker Standard product 2 and each comparison product were taken as one set, and they were consumed in such an order that Standard product 2 was consumed every time just before the comparison product was consumed. The score was written on given evaluation paper. The simple average of the scores from the five panelists is shown in Table 13.

TABLE 13

| Standard product 2 | Comparative product 7 | Comparative product 8 | Comparative product 9 |
|---|---|---|---|
| 3.0 | 3.5 | 3.8 | 4.0 |

Figure 4:
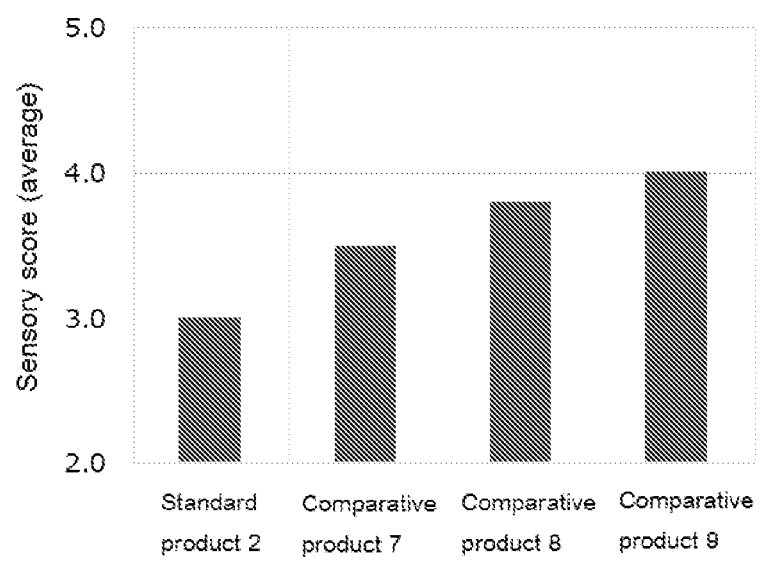
FIG. 4 shows the average scores of sensory evaluation obtained in Example 6, for comparing the intensities of aromas of the formulated flavor and/or fragrance compositions for yogurt.

When the intensity of the aroma of each comparative product was compared to that of Standard product 2 (FIG. 4), the scores of the comparative products containing increased amounts of the flavor and/or fragrance compounds with larger rates of increase in the aroma concentrations tended to be higher. This result indicates that the rate of increase in the aroma concentration obtained by the evaluation method of the present invention is useful as an index of the effect on the flavor, and further that the evaluation method of the present invention is a useful method for solving the problem.

Example 7

A formulated flavor and/or fragrance composition (Reference product 4) consisting of flavor and/or fragrance compounds commonly used in cosmetic products was prepared. The formulation of Reference product 4 is shown in Table 14.

TABLE 14

<Formulation of Reference product 4>

| Name of aroma compound | Prescription amount (parts by mass) |
|---|---|
| 1-(2,3,8,8-Tetramethyl-1,2,3,4,5,6,7,8-octahydronaphthalene-2-yl)ethane-1-one | 30.00 |
| Ethyl 2-methylpentanoate | 0.02 |
| 4-Methoxytoluene | 0.01 |
| β-Damascone | 4.00 |
| γ-Nonalactone | 20.00 |
| 2-(Tert-butyl)cyclohexyl acetate | 0.10 |
| Methyl dihydrojasmonate | 6.00 |
| Hexanal | 0.10 |
| Linalool | 0.10 |
| Dipropylene glycol | 39.67 |
| Total | 100.00 |

To a commercially available dishwashing detergent (9% surfactant [sodium alkyl ether sulfate, alkylamidopropyl betaine]), Reference product 4 was added in an amount of 0.2% or 0.5% relative to the total amount of the base to give a sample. The aroma concentrations of the flavor and/or fragrance compounds, which were released as the sample foamed up upon mixing 1.0 g of the sample and 0.5 g of tap water, were determined with PTR-TOFMS. The measurement time was approximately 1 minute after sample loading.

The rate of increase in the aroma concentration (a/b) was calculated, where b was the aroma concentration immediately after the detection of the continuously increasing aroma concentration obtained as a result of the measurement, and a was the concentration 20 seconds after b. The same measurements were performed multiple times, and the rates of increase in the aroma concentrations were averaged over the number of times of the measurements. The rates of increase in the aroma concentrations of the flavor and/or fragrance compounds composing Reference product 4 are shown in Table 15.

TABLE 15

| | Rate of increase in concentration | |
|---|---|---|
| Name of aroma compound | 0.2% addition | 0.5% addition |
| β-Damascone | 25.2 | 41.4 |
| Hexanal | 14.0 | 17.9 |
| Ethyl 2-methylpentanoate | 13.5 | 15.5 |
| γ-Nonalactone | 11.4 | 14.5 |
| 4-Methoxytoluene | 6.6 | 6.3 |
| Linalool | 5.8 | 7.6 |
| 2-(Tert-butyl)cyclohexyl acetate | 4.9 | 5.9 |
| 1-(2,3,8,8-Tetramethyl-1,2,3,4,5,6,7,8-octahydronaphthalene-2-yl)ethane-1-one | 4.7 | 5.9 |
| Methyl dihydrojasmonate | 3.9 | 5.0 |

As shown in Table 15, the rates of increase in the aroma concentrations were almost independent of the amounts added in Reference product 4. Similar to the case of Example 1, this result indicates that the rate of increase in the aroma concentration can serve as an index for evaluating the aroma diffusion characteristic of each aroma component while eliminating the influence attributed to the magnitude of the detected quantity.

Example 8

A formulated flavor and/or fragrance composition (Reference product 3) consisting of flavor and/or fragrance compounds commonly used in cosmetic products was prepared. With respect to the rates of increase in the concentrations of the aroma components in a dishwashing detergent, the flavor and/or fragrance compounds of Standard product 3 were classified into those with higher increase rates, those with moderate increase rates, and those with lower increase rates, and then formulated flavor and/or fragrance compositions (Comparative products 10-12) were prepared by only changing the amounts of the flavor and/or fragrance compounds of one group upon formulation. Comparative product 10 was a formulated flavor and/or fragrance composition in which the amounts of the flavor and/or fragrance compounds with lower rates of increase in the aroma concentrations were changed upon formulation; Comparative product 11 was a formulated flavor and/or fragrance composition in which the amounts of the flavor and/or fragrance compounds with moderate rates of increase in the aroma concentrations were changed upon formulation; Comparative product 12 was a formulated flavor and/or fragrance composition in which the amounts of the flavor and/or fragrance compounds with higher rates of increase in the aroma concentrations were changed upon formulation. The formulations of Standard product 3 and Comparative products 10-12 are shown in Table 16.

TABLE 16

| Name of aroma compound | Standard product 3 | Comparative product 10 | Comparative product 11 | Comparative product 12 |
| --- | --- | --- | --- | --- |
| β-Damascone | 1.0 | 1.0 | 1.0 | 3.0 |
| Hexanal | 1.0 | 1.0 | 1.0 | 3.0 |
| Ethyl 2-methylpentanoate | 1.0 | 1.0 | 1.0 | 3.0 |
| γ-Nonalactone | 1.0 | 1.0 | 3.0 | 1.0 |
| Linalool | 1.0 | 1.0 | 3.0 | 1.0 |
| 4-Methoxytoluene | 1.0 | 1.0 | 3.0 | 1.0 |
| 2-(Tert-butyl)cyclohexyl acetate | 1.0 | 3.0 | 1.0 | 1.0 |
| 1-(2,3,8,8-Tetramethyl-1,2,3,4,5,6,7,8-octahydronaphthalene-2-yl)ethane-1-one | 1.0 | 3.0 | 1.0 | 1.0 |
| Methyl dihydrojasmonate | 1.0 | 3.0 | 1.0 | 1.0 |
| Dipropylene glycol | 91.0 | 85.0 | 85.0 | 85.0 |
| Total | 100.0 | 100.0 | 100.0 | 100.0 |

(Sensory Evaluation)

Five experienced panelists performed sensory evaluation in terms of the intensity of the aroma upon foaming up a dishwashing detergent (about 2 g) that contained one of the formulated flavor and/or fragrance compositions (Standard product 3 and Comparative products 10-12) in an amount of 0.2% in a plastic cup. The intensity of the aroma was evaluated as a relative intensity (9 levels in increments of 0.5) to that of that of Standard product 3. The evaluation criteria are shown below.

Evaluation Criteria
Score
  5 points: Sensed stronger
  4 points: Sensed slightly stronger
  3 points: Sensed the same
  2 points: Sensed slightly weaker
  1 point: Sensed weaker Standard product 3 and each comparison product were taken as one set, and the panelists sniffed them in such an order that Standard product 3 was sniffed every time just before the comparison product was sniffed. The score was written on given evaluation paper. The simple average of the scores from the five panelists is shown in Table 17.

TABLE 17

| Standard product 3 | Comparative product 10 | Comparative product 11 | Comparative product 12 |
| --- | --- | --- | --- |
| 3.0 | 3.10 | 3.30 | 3.90 |

Figure 5:
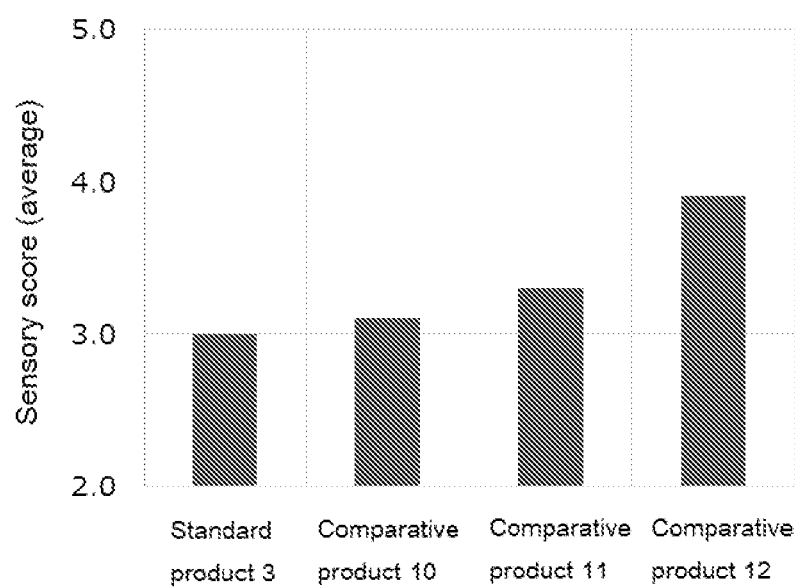
FIG. 5 shows the average scores of sensory evaluation obtained in Example 8, for comparing the intensities of aromas of the formulated flavor and/or fragrance compositions for a dishwashing detergent.

When the intensity of the aroma of each comparative product was compared to that of Standard product 3 (FIG. 5), the scores of the comparative products containing increased amounts of the flavor and/or fragrance compounds with larger rates of increase in the aroma concentrations tended to be higher. This result indicates that the rate of increase in the aroma concentration obtained by the evaluation method of the present invention is useful as an index of the effect on the intensity of the diffused aroma, and further that this evaluation method is a useful method for solving the problem.

The invention claimed is:

1. A method for evaluating effects of aroma components contained in a product on aromatic impression when the aroma components are released in an environment where the product is consumed, the method comprising the steps of:
  1) measuring, for each of two or more aroma components contained in the product, the rate of increase in the aroma concentration released in a given time period (quantity a of the aroma component detected after a given time period following the start of measurement/ quantity b of the aroma component detected immediately after the start of detection) in an environment where the product is consumed or in a model environment thereof;
  2) obtaining the magnitude relationship between the rates of increase in the aroma concentrations of the two or more aroma components obtained in Step 1); and
  3) evaluating the effects of the aroma components contained in the product on the aromatic impression of the product, using the magnitude relationship between the rates of increase in the aroma concentrations of the two or more aroma components obtained in Step 2) as an index that correlates with the magnitude relationship between the magnitude of their effects on the aromatic impression of the product.

2. The evaluation method according to claim 1, wherein the environment where the product is consumed is an environment where the product is consumed without the release characteristics of the aroma components being changed by interaction with other substance.

3. The evaluation method according to claim 1, wherein the environment where the product is consumed is an environment where the product is consumed with the release characteristics of the aroma components being changed by interaction with other substances.

4. The evaluation method according to claim 2, wherein the product is a food and the measurement of the rate of increase in the aroma concentration in Step 1) is performed in an environment where the aroma is diffused.

5. The evaluation method according to claim 3, wherein the product is a food product, other substance comprises saliva from human or artificial saliva, and the measurement of the rate of increase in the aroma concentration in Step 1) is performed in an oral cavity model environment.

6. The evaluation method according to claim 3, wherein the product is a food, other substance comprises water, and the measurement of the rate of increase in the aroma concentration in Step 1) is performed in an environment where the aroma is diffused.

7. The evaluation method according to claim 1, wherein the product is a cosmetic product and the measurement of the rate of increase in the aroma concentration in Step 1) is performed in an environment where the aroma is diffused.

8. The evaluation method according to claim 3, wherein the product is a cosmetic product and other substance comprises one or more selected from the group consisting of water, hair, skin, bathtub, floor, cloth, and glass.

9. The evaluation method according to claim 1, the method comprising, in Step 1), measuring the rate of increase in the aroma concentration using a gas chromatograph, mass spectrometer, or detector.

10. A method for preparing a flavor and/or fragrance composition, the method comprising the steps of:
   A) evaluating effects of aroma components contained in a product on the aromatic impression when the aroma components are released in an environment where the product is consumed, by the evaluation method according to claim 1; and
   B) preparing a flavor and/or fragrance composition by adjusting the prescription ratio of the aroma components contained in the product based on the evaluation obtained in step A).

11. The method for preparing a flavor and/or fragrance composition according to claim 10, the method comprising, in Step B), adjusting the prescription ratio of the aroma components in the flavor and/or fragrance composition used for the product by increasing or decreasing the ratio of the amount of the aroma component which has been defined to have significant effect on the aromatic impression of the product.

12. A method for adjusting a flavor and/or fragrance dosage of a flavor and/or fragrance composition in a product, the method comprising the steps of:
   i) evaluating effects of aroma components contained in the product on the aromatic impression when the aroma components are released in an environment where the product is consumed, by the evaluation method according to claim 1; and
   ii) adjusting the flavor and/or fragrance dosage of the flavor and/or fragrance composition in the product by preparing the flavor and/or fragrance composition while adjusting the prescription ratio of the aroma components contained in the product based on the evaluation obtained in Step i).

* * * * *